United States Patent [19]

Shimizu et al.

[11] Patent Number: 5,286,238
[45] Date of Patent: Feb. 15, 1994

[54] POWER TRANSFER DEVICE FOR FOUR-WHEEL DRIVE

[75] Inventors: Kenji Shimizu; Kazuhito Ikemoto; Masahiro Moritani; Yasuyuki Iida; Tomoyuki Kanou, all of Toyota, Japan

[73] Assignee: Toyota Jidosha Kabushiki Kaisha, Toyota, Japan

[21] Appl. No.: 942,161

[22] Filed: Sep. 2, 1992

[30] Foreign Application Priority Data

Sep. 2, 1991 [JP] Japan .................................. 3-221567
Sep. 17, 1991 [JP] Japan .................................. 3-267222

[51] Int. Cl.⁵ ...................... F16H 37/08; B60K 17/346
[52] U.S. Cl. ...................................... 475/221; 475/223; 180/247
[58] Field of Search ............... 475/223, 225, 231, 248, 475/249, 205, 206, 221; 180/247, 248, 249

[56] References Cited

U.S. PATENT DOCUMENTS

| | | | |
|---|---|---|---|
| 4,711,136 | 12/1987 | Yoshinaka et al. | 180/247 X |
| 4,804,061 | 2/1989 | Kameda | 180/247 |
| 4,841,803 | 6/1989 | Hamano et al. | 180/247 X |
| 4,878,399 | 11/1989 | Kameda | 180/248 X |
| 4,883,138 | 11/1989 | Kameda et al. | 180/249 |
| 5,057,062 | 10/1991 | Yamasaki et al. | 475/223 X |
| 5,078,660 | 1/1992 | Williams et al. | 475/221 X |

FOREIGN PATENT DOCUMENTS

| | | |
|---|---|---|
| 3600875 | 4/1987 | Fed. Rep. of Germany . |
| 2592842 | 7/1987 | France . |
| 63-176731 | 7/1988 | Japan . |
| 63-135047 | 9/1988 | Japan . |
| 63-269729 | 11/1988 | Japan . |

OTHER PUBLICATIONS

Patent Abstracts of Japan, vol. 13, No. 67, (M-798)(3415), Feb. 15, 1989, & JP-A-63 269 729, Nov. 8, 1988, Osamu Kameda, "Power Transmission for Four-Wheel-Drive Vehicle".

Primary Examiner—Leslie A. Braun
Assistant Examiner—Khoi Ta
Attorney, Agent, or Firm—Oblon, Spivak, McClelland, Maier & Neustadt

[57] ABSTRACT

A power transfer device adapted for use in combination with a primary transmission for an automotive vehicle, including a housing, a first output shaft rotatably mounted on the housing and having an input end for drive connection to an output shaft of the power transmission and an output end for drive connection to a first set of road wheels, a second output shaft rotatably mounted within the housing in parallel with the first output shaft and having an output end for drive connection to a second set of road wheels, a drive member rotatably mounted on the first output shaft, a driven member mounted on the second output shaft for rotation therewith and being drivingly connected to the drive member, a center differential in the form of a planetary gear unit mounted on the first output shaft and having a first output element in drive connection to the first output shaft and a second output element for drive connection to the drive member, and a changeover mechanism arranged between the planetary gear unit and the drive member and mounted on the first output shaft to selectively connect the second output element of the planetary gear unit to the drive member.

4 Claims, 3 Drawing Sheets

POWER TRANSFER DEVICE FOR FOUR-WHEEL DRIVE

BACKGROUND OF THE INVENTION

1. Field of the Invention

The present invention relates to a power transfer device adapted for use in combination with a primary transmission for four-wheel drive vehicles.

2. Description of the Prior Art

Disclosed in Japanese Patent Laid-open Publication No. 63-269729 is a power transfer device adapted for use in combination with a power transmission, which comprises a housing adapted to be secured to one end of the power transmission casing, a first output shaft rotatably mounted within the housing for drive connection to a set of rear road wheels, a second output shaft rotatably mounted within the housing in parallel with the first output shaft for drive connection to a set of front road wheels, a center differential in the form of a planetary gear unit mounted on the first output shaft to transfer input drive torque to the first and second output shafts, a drive sprocket rotatably mounted on the first output shaft and drivingly connected to a driven sprocket mounted on the second output shaft, and a changeover mechanism mounted on the first output shaft to selectively transfer the drive torque from an output element of the planetary gear unit to the drive sprocket. In the power transfer device, the planetary gear unit includes a carrier having a tubular hub portion arranged in surrounding relationship with the first output shaft and associated with the changeover mechanism, and the drive sprocket is arranged between the planetary gear unit and the changeover mechanism and rotatably supported on the tubular hub portion of the carrier. In such an arrangement, it is required to supply lubricating oil into double spaces among the first output shaft, the tubular hub portion of the carrier and the drive sprocket, and it is also required to assemble a bearing respectively within the double spaces among the first output shaft, the tubular hub portion of the carrier and the drive sprocket. This results in a complicated mounting construction of the drive sprocket.

SUMMARY OF THE INVENTION

It is, therefore, a primary object of the present invention to provide an improved power transfer device wherein the drive sprocket can be mounted on the first output shaft in a simple construction without causing such a problem as described above.

A secondary object of the present invention is to provide an improved power transfer device wherein a changeover mechanism for the center differential can be manufactured in a simple construction.

According to the present invention, the primary object is accomplished by providing a power transfer device adapted for use in combination with a primary transmission for an automotive vehicle, which comprises a housing, a first output shaft rotatably mounted on the housing and having an input end for drive connection to an output shaft of the power transmission and an output end for drive connection to a first set of road wheels, a second output shaft rotatably mounted within the housing in parallel with the first output shaft and having an output end for drive connection to a second set of road wheels, a drive member rotatably mounted on the first output shaft, a driven member mounted on the second output shaft for rotation therewith and being drivingly connected to the drive member, a center differential in the form of a planetary gear unit mounted on the first output shaft and having a first output element in drive connection to the first output shaft and a second output element for drive connection to the drive member, and a changeover mechanism arranged between the planetary gear unit and the drive member and mounted on the first output shaft to selectively connect the second output element of the planetary gear unit to the drive member.

BRIEF DESCRIPTION OF THE DRAWINGS

Additional objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
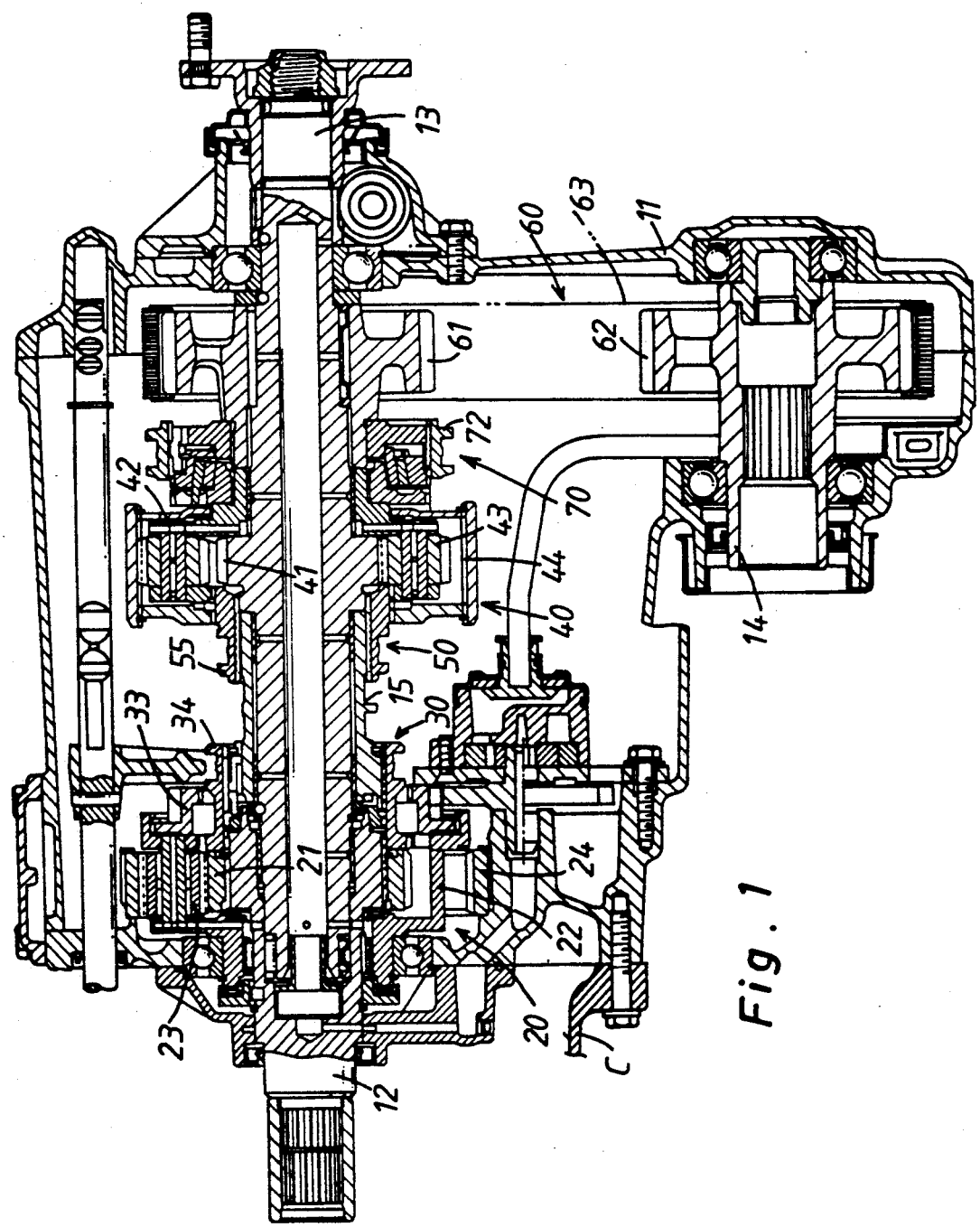
FIG. 1 is a full sectional view of a power transfer device in accordance with the present invention.

Referring now to the drawings, FIG. 1 illustrates a power transfer device for an automotive vehicle of the part-time four-wheel drive type. The power transfer device has a housing 11 secured to a casing C of a primary power transmission of the vehicle and includes, as main components, an input shaft 12, a first output shaft 13, a second output shaft 14, an ancillary change-speed mechanism 20 in the form of a planetary gear unit, a first changeover mechanism 30 for the planetary gear unit 20, a center differential 40, a second changeover mechanism 50 for the center differential 40, a drive mechanism 60 for the second output shaft 14 and a third changeover mechanism 70 for selectively establishing a two-wheel drive train or a four-wheel drive train. The input shaft 12 is rotatably supported on a left-hand side wall of the housing 11 through a needle bearing, a carrier 22 of the planetary gear unit 20 and a ball bearing. The input shaft 12 has an internally splined portion for connection to an output shaft (not shown) of the primary power transmission and has an externally splined portion 32 for mounting the planetary gear unit 20 thereon. The first output shaft 13 is rotatably supported on a right-hand side wall of housing 11 through a ball bearing and is arranged coaxially with the input shaft 12 for drive connection to a set of rear wheel drive axles (not shown). The first output shaft 13 has an inner end portion coupled within a hollow inner end portion of input shaft 12 through a needle bearing for relative rotation. The second output shaft 14 is arranged in parallel with the first output shaft 13 and is rotatably mounted within the housing 11 through a pair of axially spaced ball bearings for drive connection to a set of front wheel drive axles (not shown).

The planetary gear unit 20 comprises a sun gear 21 mounted in place on the externally splined portion 32 of input shaft 12 for rotation therewith, a stationary ring gear 24 arranged concentrically with the sun gear 21 and secured to an internal cylindrical wall of housing 11, a plurality of planetary gears 23 rotatably supported by the carrier 22 and in mesh with the sun gear 21 and ring gear 24, and an internally splined side member 33 integrally fixed to the right end of carrier 22 for rotation therewith.

Figure 2:
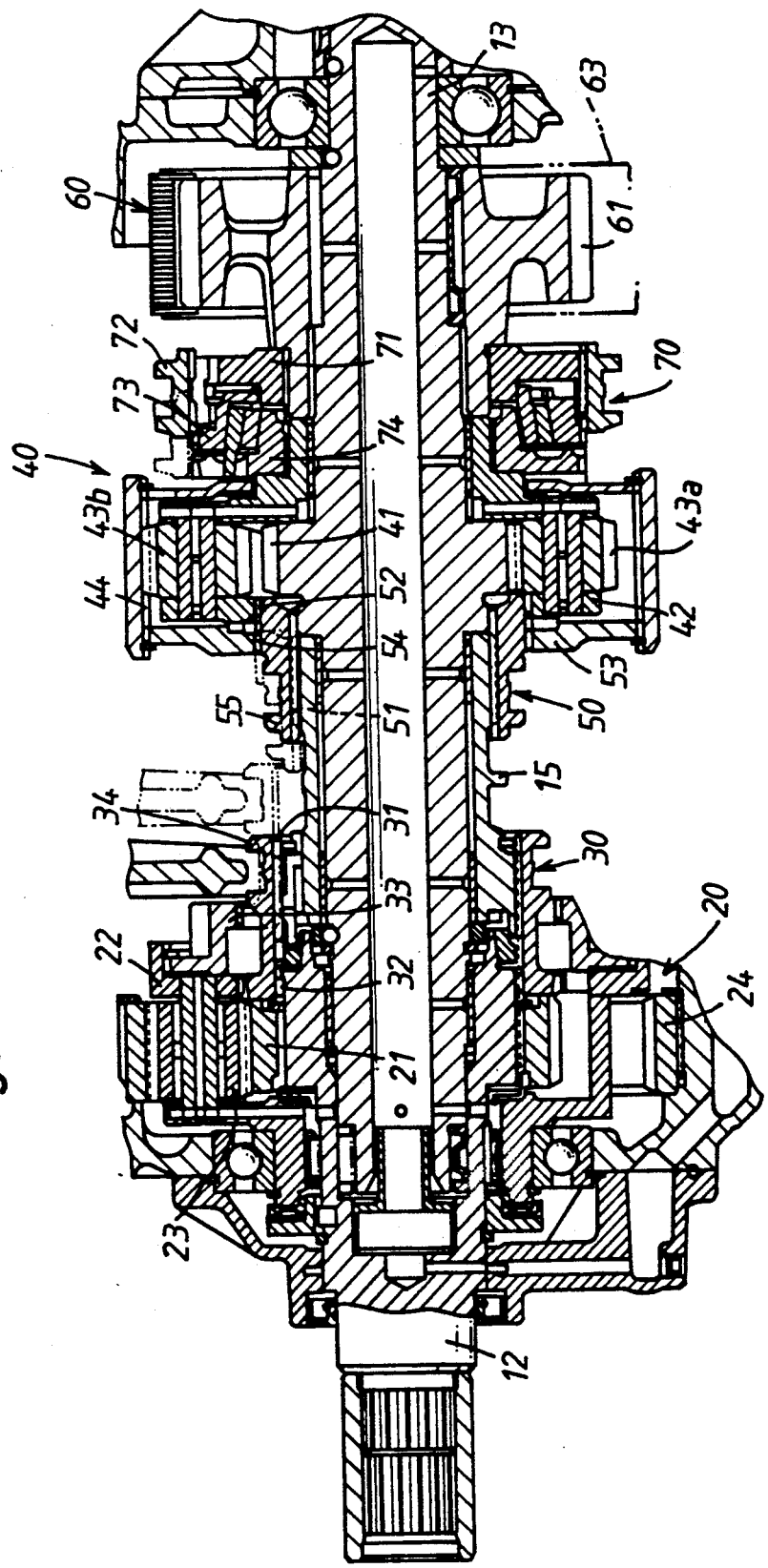
FIG. 2 is an enlarged sectional view of a main portion of the power transfer device shown in FIG. 1.

The first changeover mechanism 30 is arranged adjacent the planetary gear unit 20 to selectively establish high and low speed drive power trains. The first changeover mechanism 30 includes an internally splined clutch sleeve 34 axially slidably mounted on a tubular output member 15 which is rotatably mounted on the first output shaft 13. As shown in FIG. 2, the clutch sleeve 34 has an internal spline 31 engageable with the externally splined portion 32 of input shaft 12 through a synchronizer assembly and has an external spline engageable with the internal spline of side member 33. When retained in a first position as shown by a solid line in FIG. 2, the clutch sleeve 34 is disengaged from the internal spline of side member 33 and engaged with the externally splined portion 32 of input shaft 12 at its internal spline 31 to effect direct connection between the input shaft 12 and the tubular output member 15 thereby to transfer drive torque from the input shaft 12 to the output member 15 at the same speed as that of input shaft 12. When shifted to and retained in a second position as shown by an imaginary line in FIG. 2, the clutch sleeve 34 is disengaged from the externally splined portion 32 of input shaft 12 and engaged with the internal spline of side member 33 at its external spline to drivingly connect the input shaft 12 to the output member 15 through the planetary gear unit 20 thereby to transfer the drive torque from input shaft 12 to the output member 15 at a predetermined reduction speed ratio.

Figure 3:
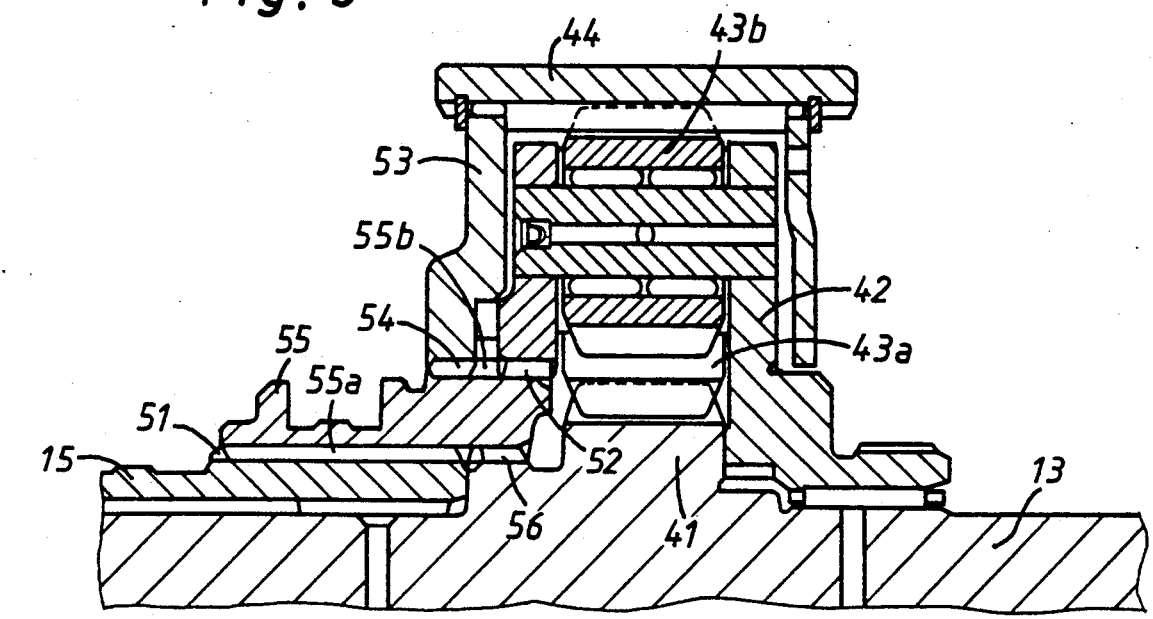
FIG. 3 is an enlarged sectional view of a planetary gear unit shown in FIG. 2.
Figure 4:
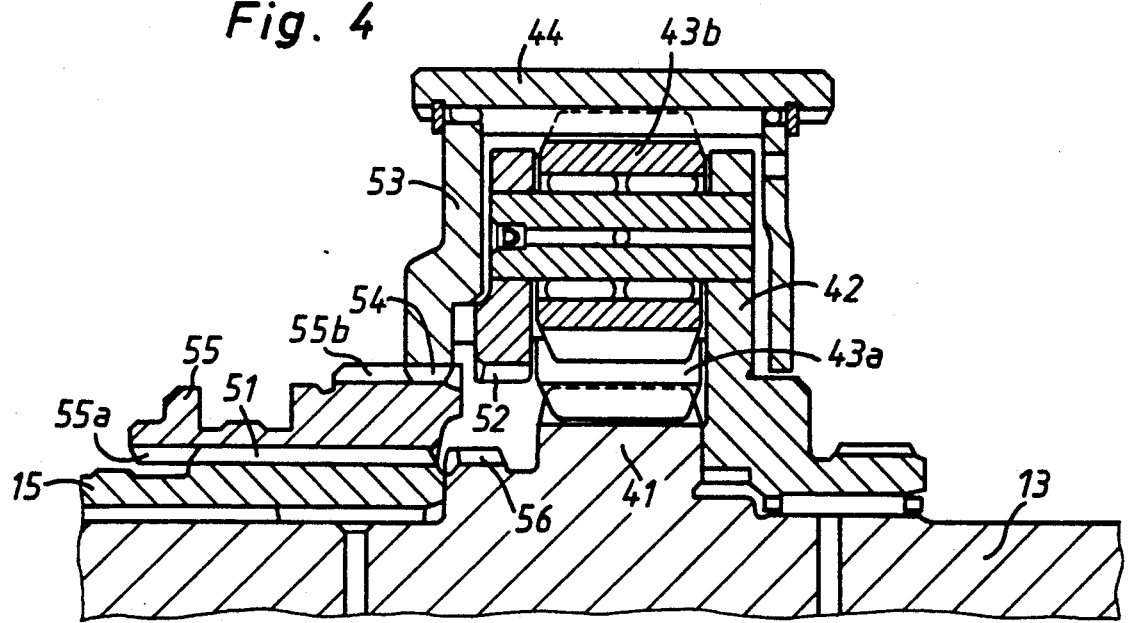
FIG. 4 is an enlarged sectional view showing a shifted condition of the planetary gear unit shown in FIG. 3.

As shown in FIGS. 3 and 4, the center differential 40 is in the form of a planetary gear unit of the double pinion type which comprises a sun gear 41 integrally formed with the first output shaft 13, a carrier 42 rotatably mounted at its right-hand hub portion on the first output shaft 13 through a needle bearing for relative rotation, a plurality of internal planetary gears 43a rotatably supported by the carrier 42 and in mesh with the sun gear 41, a plurality of external planetary gears 43b rotatably supported by the carrier 42 and in mesh with the internal planetary gears 43a, and a ring gear 44 concentrically assembled with the carrier 42 and in mesh with the external planetary gears 43b.

The second changeover mechanism 50 is arranged between the first changeover mechanism 30 and the center differential 40 to selectively effect differentiation between the first and second output shafts 13 and 14. As shown in FIGS. 3 and 4, the second changeover mechanism 50 includes a clutch sleeve 55 axially slidably mounted on the tubular output member 15. The clutch sleeve 55 has an internal spline 55a in continual engagement with an externally splined portion 51 of tubular output member 15 and engageable with an externally splined portion 56 of first output shaft 13 and has an external spline 55b in continual engagement with an internally splined portion 54 of a side member 53 of ring gear 44 and engageable with an internal spline 52 formed on the left-hand portion of carrier 42. The internal spline 55a of clutch sleeve 55 is chamfered only at its right end for smooth engagement with the external splined portion 56 of first output shaft 13, while the external spline 55b of clutch sleeve 55 is also chamfered only at its right end for smooth engagement with the internal spline 52 of carrier 42.

When retained in a first position as shown in FIG. 3, the clutch sleeve 55 is engaged with the externally splined portion 56 of first output shaft 13 and the internally splined portion 52 of carrier 42 to directly connect the tubular output member 15 to the carrier 42 and the first output shaft 13 thereby to lock the center differential 40. When shifted to and retained in a second position as shown in FIG. 4, the clutch sleeve 55 is disengaged from the externally splined portion 56 of first output shaft 13 and the internally splined portion 52 of carrier 42 and maintained in engagement with the internally splined portion 54 of side member 53 to drivingly connect the tubular output member 15 to the carrier 42 and the first output shaft 13 through the center differential 40 thereby to effect differentiation between the first and second output shafts 13 and 14.

As shown in FIG. 1, the drive mechanism 60 includes a drive sprocket 61 rotatably mounted on the first output shaft 13, a driven sprocket 62 integrally provided on the second output shaft 14 for rotation therewith and a drive chain 63 stretched over the drive and driven sprockets 61 and 62. The third changeover mechanism 70 is arranged between the center differential 40 and the drive sprocket 61 and mounted on the first output shaft 13 to selectively transfer the drive torque from the right-hand hub portion of carrier 42 to the second output shaft 14 through the drive mechanism 60. As shown in FIG. 2, the third changeover mechanism 70 includes an externally splined hub member 71 fixedly assembled with the drive sprocket 61 for rotation therewith, an internally splined clutch sleeve 72 axially slidably mounted on the hub member 71, an externally splined piece 74 fixedly mounted the right-hand hub portion of carrier 42 and a synchronizer assembly 73 coupled with the externally splined piece 74. When retained in a first position as shown by a solid line in FIG. 2, the clutch sleeve 72 is disengaged from the externally splined piece 74 to allow relative rotation between the drive sprocket 61 and the first output shaft 13. When shifted to and retained in a second position as shown by an imaginary line in FIG. 2, the clutch sleeve 72 is engaged with the externally splined piece 74 to rotate the drive sprocket 61 with the carrier 42 of center differential 40 thereby to extablish a four-wheel drive train.

Hereinafter, operation of the power transfer device will be described with reference to FIGS. 1 and 2. Assuming that all the clutch sleeves 34, 55 and 72 are retained in their first positions as shown by the solid lines in FIG. 2, the drive torque from input shaft 12 is transmitted to the tubular output member 15 at a high speed, and in turn, the clutch sleeve 55 acts to directly transfer the drive torque from the output member 15 to the carrier 42 and the first output shaft 13 under a locked condition of the center differential 40 thereby to establish a high speed two-wheel drive train. When the clutch sleeve 72 is shifted to the second position in a condition where the clutch sleeves 34, 55 are retained in their first positions, the drive torque from input shaft 12 is transmitted to the tubular output member 15 at a high speed, and in turn, the clutch sleeve 55 acts to directly transfer the drive torque from the output member 15 to the carrier 42 and the first output shaft 13 under the locked condition of the center differential 40 as described above. In this instance, the clutch sleeve 72 of third changeover mechanism 70 acts to transfer the drive torque from carrier 42 to the second output shaft 14 through the drive mechanism 60 to establish a high speed four-wheel drive train.

Assuming that the clutch sleeve 34 of first changeover mechanism 30 is retained in its first position as shown by the solid line in FIG. 2 and that the clutch sleeves 55 and 72 of second and third changeover mechanisms 50 and 70 are shifted to and retained in their second positions as shown by the imaginary lines in FIG. 2, the drive torque from input shaft 12 is transmitted to the tubular output member 15 at a high speed, and in turn, the clutch sleeve 55 acts to transfer the drive torque to the carrier 42 and the first output shaft 13 through the center differential 40. In this instance, the clutch sleeve 72 of third changeover mechanism 70 acts to transfer the drive torque from carrier 42 to the second output shaft 14 through the drive mechanism 60 to establish a high speed four-wheel drive train, and the center differential 40 acts to effect differentiation between the first and second output shafts 13 and 14.

Assuming that the clutch sleeves 34 and 72 of first and third changeover mechanisms 30 and 70 are shifted to and retained in their second positions as shown by the imaginary lines in FIG. 2 and that the clutch sleeve 55 of second changeover mechanism 50 is retained in its first position as shown by the solid line in FIG. 2, the drive torque from input shaft 12 is transmitted to the tubular output member 15 through the ancillary transmission 20 at a low speed, and in turn, the clutch sleeve 55 of second changeover mechanism 50 acts to directly transfer the drive torque from the output member 15 to the carrier 42 and the first output shaft 13 in a locked condition of the center differential 40. In this instance, the clutch sleeve 72 of third changeover mechanism 70 acts to transfer the drive torque from the carrier 42 to the second output shaft 14 through the drive mechanism 60 to establish a low speed four-wheel drive train.

As is understood from the above description, the power transfer device is characterized in that the third changeover mechanism 70 is arranged between the planetary gear unit 40 and the drive sprocket 61 to selectively establish the two-wheel drive train or the four-wheel drive train. With such an arrangement of the third changeover mechanism 70, the drive sprocket 61 can be mounted on the first output shaft 13 in a simple construction. In the power transfer device of the present invention, the second changeover mechanism 50 is characterized in that the clutch sleeve 55 is maintained in continual engagement with the internally splined portion 54 of side member 53 of ring gear 44 when shifted to and from the second position. With such an arrangement of the clutch sleeve 55, the translation length of the clutch sleeve 55 can be shortened, and the meshing engagement of the clutch sleeve with the externally splined portion 56 of first output shaft 13 and the internally splined portion 52 of carrier 42 can be smoothly conducted by only the right end chamfer of clutch sleeve 55.

What is claimed is:

1. A power transfer device adapted for use in combination with a power transmission for an automotive vehicle, comprising:

a housing;

a first output shaft rotatably mounted on said housing and having an input end for drive connection to an output shaft of said power transmission and an output end for drive connection to a first set of road wheels;

a second output shaft rotatably mounted within said housing in parallel with said first output shaft and having an output end for drive connection to a second set of road wheels;

a drive member rotatably mounted on said first output shaft;

a driven member mounted on said second output shaft for rotation therewith and being drivingly connected to said drive member;

a center differential in the form of a planetary gear unit mounted on said first output shaft and having a first output element in drive connection to said first output shaft and a second output element for drive connection to said drive member; and a changeover mechanism arranged between said planetary gear unit and said drive member and mounted on said first output shaft to selectively connect the second output element of said planetary gear unit to said drive member;

wherein the first output element of said planetary gear unit is in the form of a sun gear mounted on said first output shaft for rotation therewith and the second output element of said planetary gear unit is in the form of a carrier rotatably mounted on said first output shaft, and wherein a second changeover mechanism is arranged adjacent said planetary gear unit at the opposite side relative to said first-named changeover mechanism to selectively lock said planetary gear unit.

2. A power transfer device adapted for use in combination with a power transmission for an automotive vehicle, comprising:

a housing;

a first output shaft rotatably mounted on said housing and having an input end for drive connection to an output shaft of said power transmission and an output end for drive connection to a first set of road wheels;

a second output shaft rotatably mounted within said housing in parallel with said first output shaft and having an output end for drive connection to a second set of road wheels;

a drive member rotatably mounted on said first output shaft;

a driven member mounted on said second output shaft for rotation therewith and being drivingly connected to said drive member;

a center differential in the form of a planetary gear unit mounted on said first output shaft and having a first output element in drive connection to said first output shaft and a second output element for drive connection to said drive member; and a changeover mechanism arranged between said planetary gear unit and said drive member and mounted on said first output shaft to selectively connect the second output element of said planetary gear unit to said drive member;

wherein a second changeover mechanism is arranged adjacent said planetary gear unit at the opposite side relative to said first-named changeover mechanism to selectively lock said planetary gear unit.

3. A power transfer device as claimed in claim 2, wherein said planetary gear unit includes a sun gear provided on said first output shaft for rotation therewith, a carrier rotatably mounted on said first output shaft and having an internally splined portion formed at one side thereof and a tubular hub portion formed at the other side thereof in surrounding relationship with said first output shaft for drive connection to said drive member, a plurality of planetary gears supported by said carrier and in mesh with said sun gear and a ring gear arranged concentrically with said carrier and in mesh with said planetary gears, said ring gear having an internally splined portion formed at one side thereof, and wherein said second changeover mechanism includes an externally splined clutch sleeve axially slidably mounted on a tubular member in surrounding relationship with said first output shaft, said clutch sleeve being maintained in continual engagement with the internally splined portion of said ring gear and shiftable between a first position in which it is engaged with an externally splined portion of said first output shaft and the internally splined portion of said carrier and a second position in which it is disengaged from the externally splined portion of said first output shaft and the internally splined portion of said carrier.

4. A power transfer device as claimed in claim 1, wherein said planetary gear unit comprises a plurality of planetary gears supported by said carrier and in mesh with said sun gear and a ring gear arranged concentrically with said carrier and in mesh with said planetary gears, said carrier having an internally splined portion formed at one side thereof and a tubular hub portion formed at the other side thereof in surrounding relationship with said first output shaft for drive connection to said drive member, and said ring gear having an internally splined portion formed at one side thereof, and wherein said second changeover mechanism includes an externally splined clutch sleeve axially slidably mounted on a tubular member in surrounding relationship with said first output shaft, said clutch sleeve being maintained in continual engagement with the internally splined portion of said ring gear and shiftable between a first position in which it is engaged with an externally splined portion of said first output shaft and the internally splined portion of said carrier and a second position in which it is disengaged from the externally splined portion of said first output shaft and the internally splined portion of said carrier.

* * * * *